| (12) | United States Patent | (10) Patent No.: | US 10,931,161 B2 |
|---|---|---|---|
| | Ehrsam et al. | (45) Date of Patent: | Feb. 23, 2021 |

(54) PUMP MOTOR WITH COMPONENT MOUNT SUPPORT PLATE

(71) Applicant: Bühler Motor GmbH, Nuremberg (DE)

(72) Inventors: Jürgen Ehrsam, Fürth (DE); Klaus Weiske, Schwaig (DE); Harald Rausch, Fürth (DE); Florian Stückl, Nuremberg (DE); Jens Weiss, Fürth (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 260 days.

(21) Appl. No.: 15/483,104

(22) Filed: Apr. 10, 2017

(65) Prior Publication Data

US 2017/0302126 A1   Oct. 19, 2017

(30) Foreign Application Priority Data

Apr. 15, 2016   (DE) ...................... 10 2016 206 402.9

(51) Int. Cl.
*H02K 5/22* (2006.01)
*H02K 5/128* (2006.01)
(Continued)

(52) U.S. Cl.
CPC .............. *H02K 5/22* (2013.01); *F04D 25/06* (2013.01); *H02K 5/128* (2013.01); *H02K 5/225* (2013.01);
(Continued)

(58) Field of Classification Search
CPC .......... H02K 5/22; H02K 5/128; H02K 5/225; H02K 11/33
(Continued)

(56) References Cited

U.S. PATENT DOCUMENTS

2001/0051098 A1 *  12/2001  Kenney .................. F02M 37/08
                                                       417/410.1
2004/0027014 A1 *   2/2004  Weigold ................. H02K 5/225
                                                         310/68 R
(Continued)

FOREIGN PATENT DOCUMENTS

DE              19948972      *  4/2001  ............... H02K 1/06
DE       10 2013 202 586 A1     9/2013
(Continued)

OTHER PUBLICATIONS

Performance Comparison of Internal and External Rotor (Year: 2009).*

*Primary Examiner* — Terrance L Kenerly (74) *Attorney, Agent, or Firm* — Westerman, Hattori, Daniels & Adrian, LLP (57) ABSTRACT

A centrifugal pump motor comprising a permanent magnet rotor, a wound stator that is separated from the permanent magnet rotor by means of a containment shell, a circuit board having a large electronic component electrically connected to it, and a motor housing with a plug connection. The centrifugal pump motor provides a robust design for a generic centrifugal pump motor, so as to prevent damage during installation and operation, as well as additionally ensuring a space-saving and compact arrangement of the electronic components, in order to enable optimal heat dissipation of the electronic components. Furthermore, a simple way of manufacturing is provided.

24 Claims, 6 Drawing Sheets (51) Int. Cl.
*H02K 11/00* (2016.01)
*H02K 11/33* (2016.01)
*F04D 25/06* (2006.01)
*H02K 15/14* (2006.01)
*H02K 11/30* (2016.01)
*H02K 7/14* (2006.01)

(52) U.S. Cl.
CPC ......... *H02K 11/0094* (2013.01); *H02K 11/33* (2016.01); *H02K 15/14* (2013.01); *H02K 7/14* (2013.01); *H02K 11/30* (2016.01); *H02K 2209/00* (2013.01); *H02K 2211/03* (2013.01)

(58) Field of Classification Search
USPC .......................................................... 310/71
See application file for complete search history.

(56) References Cited

U.S. PATENT DOCUMENTS

| | | | |
|---|---|---|---|
| 2010/0164311 A1* | 7/2010 | Mock ................... | H02K 7/1008 310/83 |
| 2011/0284512 A1* | 11/2011 | Stork Genannt Wersborg ............ | B23K 26/02 219/121.72 |
| 2012/0183421 A1* | 7/2012 | Kim ......................... | H02K 7/14 417/423.7 |
| 2014/0190219 A1* | 7/2014 | Kim ....................... | H02K 21/12 68/140 |

FOREIGN PATENT DOCUMENTS

| | | |
|---|---|---|
| JP | 2012-110165 A | 6/2012 |
| JP | 2013-110833 A | 6/2013 |

* cited by examiner

Fig. 1

Fig. 2    Section A

PUMP MOTOR WITH COMPONENT MOUNT SUPPORT PLATE

BACKGROUND OF THE INVENTION

(1) Field of the Invention

The invention relates to a centrifugal pump motor comprising a permanent magnet rotor, a wound stator that is separated from the permanent magnet rotor by means of a containment shell, a circuit board having a large electronic component electrically connected to it, and a motor housing with a plug connection. The large electronic component can be a round or non-round component having a diameter and/or a thickness/width that is many times bigger than the circuit board thickness. Likewise, more than one large component can be connected to the circuit board.

(2) Description of Related Art Including Information Disclosed Under 37 CFR 1.97 and 1.98

In combustion engines in the field of motor vehicles, mechanical centrifugal pumps driven by the crankshaft via a gear belt are generally provided as the main cooling water pump. As a support or an alternative in a shut-off combustion engine, electric ancillary cooling water pumps are used, which are generally designed as electronically commutated direct-current motors. Main cooling water pumps can also be electrically driven. Due to constricted installation conditions, high thermal stresses as well as the use inside the engine compartment, particularly high requirements must be met regarding robustness, heat dissipation characteristics and a compact installation space utilization. Likewise, cooling water pumps are used with hybrid vehicles and electric vehicles. In the latter, they are used predominantly in the cooling circuit of a battery cooling system. Usually, with electronically commutated direct-current motors, circuit boards with a plurality of electronic components are required, which often results in difficulties of finding enough space to fit them on a limited circuit board surface. Furthermore, often plug-in connectors are provided that have to absorb significant forces during the installation of a mating plug, which, in the case of plug-in contacts that are mechanically and electrically fixed directly on a circuit board, can result in damage.

BRIEF SUMMARY OF THE INVENTION

Thus, the invention seeks to solve the problem of providing a robust design for a centrifugal pump motor, so as to prevent damage during installation and operation, as well as additionally ensuring a space-saving and compact arrangement of the electronic components, in order to enable optimal heat dissipation of the electronic components. Furthermore, a simple way of manufacturing is to be ensured.

By arranging large electronic components in a second plane, the circuit board surface underneath the said components can be utilized for smaller SMD components. This allows the possibility of extremely compact circuitry. Receiving theses components on the support plate makes it possible to exert a pressure force onto these components and to clamp them between the motor housing and the support plate. This favors the heat transfer and a compact design with few hollow spaces. Furthermore, the electrical contacts on the circuit board are not damaged by this.

A particularly advantageous refinement consists in providing a limit stop for at least one contact element, which contact element must receive mounting forces. In a further refinement of this idea, the contact element has two angled portions, whereby one section between the two angled portions abuts against the limit stop, or is adapted to abut against the limit stop when force is exerted onto the contact element, particularly during assembly of a mating plug. The limit stop absorbs the mechanical forces, so that no damage can be inflicted on the electrical connection between the contact element and the circuit board.

A further key aspect of the invention is reflected in the fact that the support plate between the circuit board and the motor housing is held without any play. This precludes any vibration-induced damage during operation and enhances the compactness of the structure. The support plate and the circuit board are held without play between the stator and the motor housing. Thus, the circuit board is also mounted in a vibration-proof and compact manner respectively. For this purpose, the stator is provided with an insulating element that directly abuts against the circuit board in the direction parallel to the axis.

Preferably, this insulating element abuts against the edge region of the circuit board at least in three points. This results in defined conditions by forming a three-point support and excludes any tolerance-related vibration sources that might surface due to undefined gap distances between the joining partners.

A particularly preferred refinement of the invention provides for the insulating element to be welded to the motor housing. This enables the support plate and the circuit board to be permanently fixed in the intermediate position taken during assembly.

Preferably, the support plate has several protrusions abutting against the insulating element, which protrusions define the distance between the stator and the support plate as well as the circuit board. For a radial limitation of the installation space for the circuit board, several receiving elements are provided on the support plate. In addition, the radial installation space for the insulating element is also limited by the receiving elements.

The support plate (10) fulfills a centering function for the circuit board (5), which centering function can be provided in particular by means of receiving elements (17) and/or scraper ribs (61). In this way, the circuit board is held and clamped.

For stiffening purposes of the support plate, an at least partly circumferential collar is integrally formed at the edge of a base plate. Moreover, stiffening ramps are provided, which cause a radial stiffening of the collar.

For optimal heat dissipation and secure mechanical connection of the electronic component, the receiving geometries are integrally formed with the support plate, which receiving geometries are preferably adapted to the geometry of the electronic component.

In order to be able to construct as compactly as possible, a recess is provided for the electronic component, which recess allows the electronic component to sink deeper into the support plate. Thus, the axial space requirement is minimized.

A particularly effective heat dissipation via the motor housing is favored by the fact that the motor housing features a bulge in its bottom area, which bulge is adapted to the electronic component. In order to enhance the heat transfer, a heat conduction agent, in particular, a thermally conductive paste, can be incorporated between the electronic component and the bulge. By means of the mechanical pressure that can be exerted due to the sandwich-like structure, the heat conduction agent can be pressed into all remaining gaps.

Both one electronic component and also multiple electronic components can be fitted onto the support plate and held by respective receiving geometries. Preferably, at least one electrolytic capacitor and one inductor are provided. As the electrolytic capacitor usually has a bigger diameter, the corresponding bulge in the bottom part of the motor housing and the receiving geometry on the support plate have bigger dimensions respectively.

A second solution for the problem is proposed by the method claim that features the following assembly order: a) providing a motor housing; b) providing a pre-assembled unit comprising the stator, the circuit board and the support plate; c) inserting the pre-assembled unit into the motor housing; d) holding down the assembly and welding an insulating element of the stator onto the motor housing, thereby exerting a force; e) assembling the containment shell and the permanent magnet rotor; and f) assembling the pump head.

In a refinement of this method, it is proposed for the welding of the insulating element to the motor housing to be performed via laser transmission welding. This is a proven method for connecting plastic materials. For this purpose, the housing material consists a material that is transparent for laser light, while the insulating element consists of material that absorbs this laser light. One insulating element is welded onto the motor housing in three welding regions. Another insulating element is welded to the motor housing with a largely continuous weld seam. The three welding regions are connected to the insulating element in a resilient manner, thus providing a possibility for length compensation. The insulating element that is arranged close to the circuit board is designed to receive a bigger axial force and is therefore welded over a larger circumferential region or over the full circumference.

In the region of the weld connection, the outer diameter of the insulating element is bigger than the inner diameter of the motor housing. This results in a press fit between the motor housing and the insulating element. A laser beam that is directed from the outside onto the motor housing penetrates it and strikes the welding region of the insulating element in only slightly weakened condition, where it is largely absorbed and thus heats the welding region and the adjoining motor housing, until the plastic material melts. Due to the press fit, the motor housing and the insulating element move slightly towards each other in the welding region and form a very close connection. In order to create a good weld connection, the whole region where the welding partners abut against each other must be heated. For this purpose, the width of the welding region is adapted to the diameter of the laser beam.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
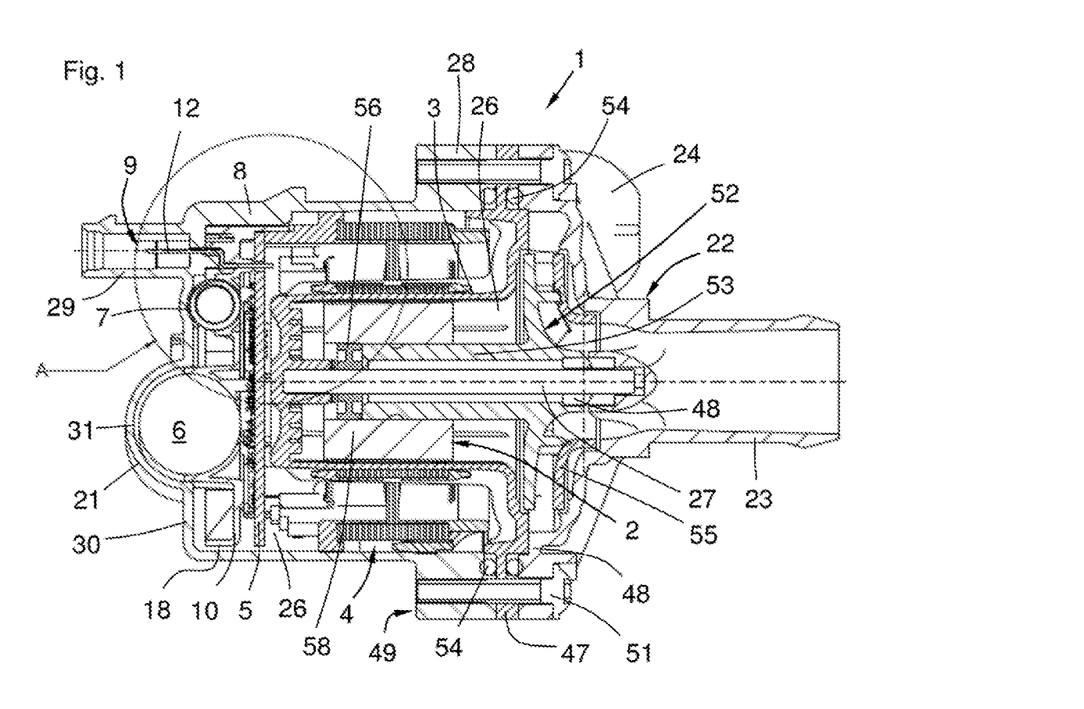
FIG. 1, a sectional view of the centrifugal pump motor according to the invention, FIG. 2, an enlarged section A of FIG. 1, FIG. 3, a front view of a support plate, FIG. 4, a first section A-A through FIG. 3, FIG. 5, a second section B-B through FIG. 3, FIG. 6, a top view of the support plate, FIG. 7, a back view of the support plate, FIG. 8, a three-dimensional representation of the centrifugal pump motor, FIG. 9, a front view of an alternative support plate, FIG. 10, a three-dimensional representation of the alternative support plate, FIG. 11, a side view of the alternative support plate and FIG. 12, a top view of an alternative support plate.

FIG. 1 shows a sectional view of a centrifugal pump motor 1 according to the invention, having a wound stator 4, a permanent magnet rotor 2, a containment shell 3, a pump head 22, a circuit board 5, a support plate 10 and a motor housing 8. The stator 4, the circuit board 5 and the support plate 10 are positioned in a dry space 25. The permanent magnet rotor 2 is pivot-mounted in a wet space 26 about an axis 27, which is, on the one hand, fixed in the containment shell 3, and on the other hand, in the pump head 22. The containment shell 3 is provided with a containment shell flange 47, and the pump head 22 is provided with a pump head flange 48. The motor housing 8 is formed in a pot-shaped manner and is provided with a housing flange 28 and a connector chamber 29. The pump head flange 48 and the containment shell flange 47 as well as the housing flange 28 are provided with screw holes 49, with screws 51, which serve the purpose of screwing the pump head 22 and the containment shell 3 onto the motor housing 8. On both sides of the containment shell flange 47, O-rings 54 are arranged as sealing elements. The circuit board 5 is equipped with a plurality of SMD components. Larger components like an electrolytic capacitor 6 and an inductor 7 are held mechanically on the support plate 10, but are contacted electrically on the circuit board 5.

The circuit board 5 and the support plate 10 are axially fixed between the stator 4 and the motor housing 8. The circuit board 5 is axially and radially fixed between the stator 4 and the support plate 10. In the support plate 10, a contact element 12 is mechanically received, which contact element is also electrically connected to the circuit board 5. A bottom 30 of the pot-shaped motor housing 8 is provided with a bulge 21, which is adapted to the shape of the electrolytic capacitor 6. Between the electrolytic capacitor 6 and the bulge 21, a heat conduction agent 31 is incorporated. Further, a pump impeller 52 that is integrally formed with a hollow shaft 53 are shown in FIG. 1. The pump impeller 52 is provided with a cover disc 55. The permanent magnet rotor 2, along with the pump impeller 52, is rotatably mounted via a first fixed bearing 56 and a second spherical bearing 57 on the axis 27 and between the pump head 22 and the containment shell 3. The fixed bearing 56 is arranged between the axis 27 and a plastic-bonded ring magnet 58 that is molded around the hollow shaft 53, and bears the pump impeller 52 radially as well as axially via the end of the hollow shaft 53 and a stop disc 20, which abuts against a fastening sleeve 59 that is integrally formed with the containment shell 3 (see FIG. 2).

Figure 2:
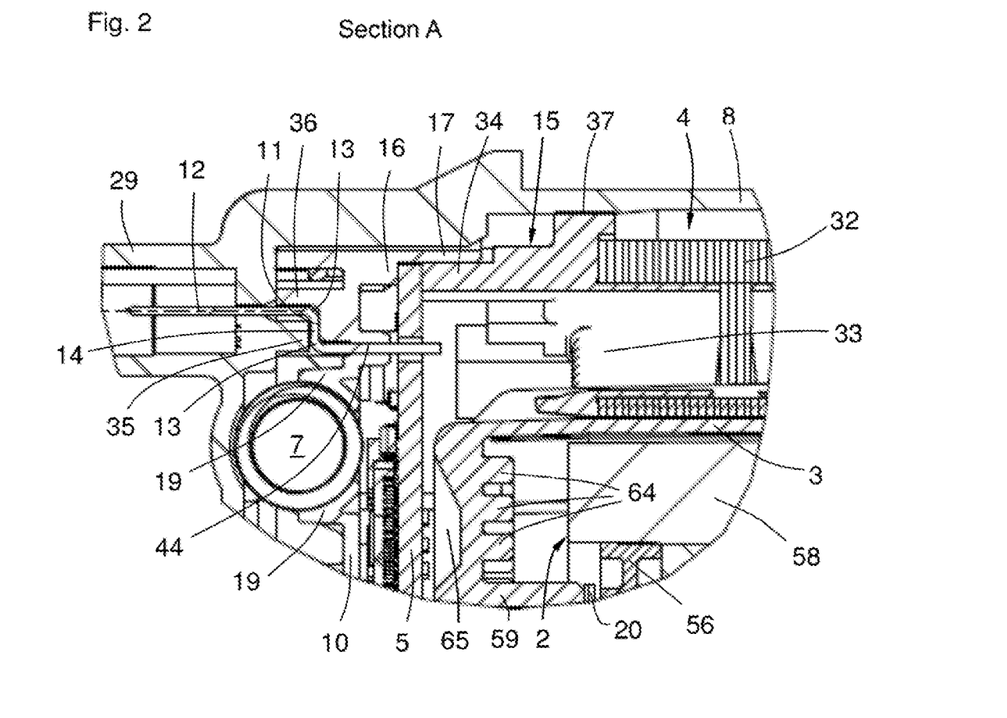

FIG. 2 shows an enlarged section A from FIG. 1, with the stator 4, the motor housing 8, the circuit board 5, the support plate 10, the inductor 7 that is received within a receiving geometry 19, the connector chamber 29, the contact element 12, the containment shell 3 and the permanent magnet rotor 2. The stator 4 consists of a laminated core 32, an insulating element 15 and a winding 33. A protruding region 34 of the insulating element 15 abuts against the edge region of the circuit board 5 in three places. A receiving element 17 of the support plate 10 radially limits the installation space of the insulating element 15 in the area of the protruding region 34. In a similar way, the installation space of the circuit board 5 is radially limited by the receiving element 17 of the support plate 10. The contact element 12 is held in a positive-locking manner between a limit stop 11 of the support plate 10 and a housing protrusion 35 in the bottom 30 of the motor housing in axial direction. In addition to that, the contact element 12 is also held in radial direction between the housing protrusion 35 and a radial boundary 36 of the support plate 10.

The contact element 12 is provided with angled portions 13. A region 14 between the angled portions 13 abuts on the one hand against the limit stop 11 and, on the other hand, against the housing protrusion 35. The contact element 12 is received within a contact channel 44, which enables the connection with the circuit board 5. The containment shell 3 is provided in its wet space with cooling pins 64, and in its dry side with recesses 65, which can be filled with a heat conduction agent 31, e.g. a heat conducting paste. The motor housing 8, the insulating element 15, the support plate 10, the containment shell 3 and the pump head 22 consist of a material that can be processed via injection molding. Furthermore, the housing material consists of material that is transparent for laser light, while the insulating element 15 consists of material that absorbs this laser light. The insulating element 15 is welded onto the motor housing via three welding areas or regions 37 by means of a laser transmission welding method. For this purpose, the outer diameter of the insulating element 15 is bigger than the interior diameter of the motor housing 8 in the welding region 37. This results in a press fit between the motor housing 8 and the insulating element 15.

A laser beam that is directed from the outside onto the motor housing 8 penetrates it and strikes the welding region 37 of the insulating element 15 in only slightly weakened condition, where it is largely absorbed and thus heats the welding region 37 and the adjoining motor housing 8, until the plastic material melts. Due to the press fit, the motor housing 8 and the insulating element 15 move slightly towards each other in the welding region 37 and form a very close connection. In order to create a good weld connection, the whole region where the welding partners abut against each other must be heated. For this purpose, the width of the welding region 37 is adapted to the diameter of the laser beam. Furthermore, the fastening sleeve 59, the stop disc 20 and the ring magnet 58 can be seen.

Figure 3:
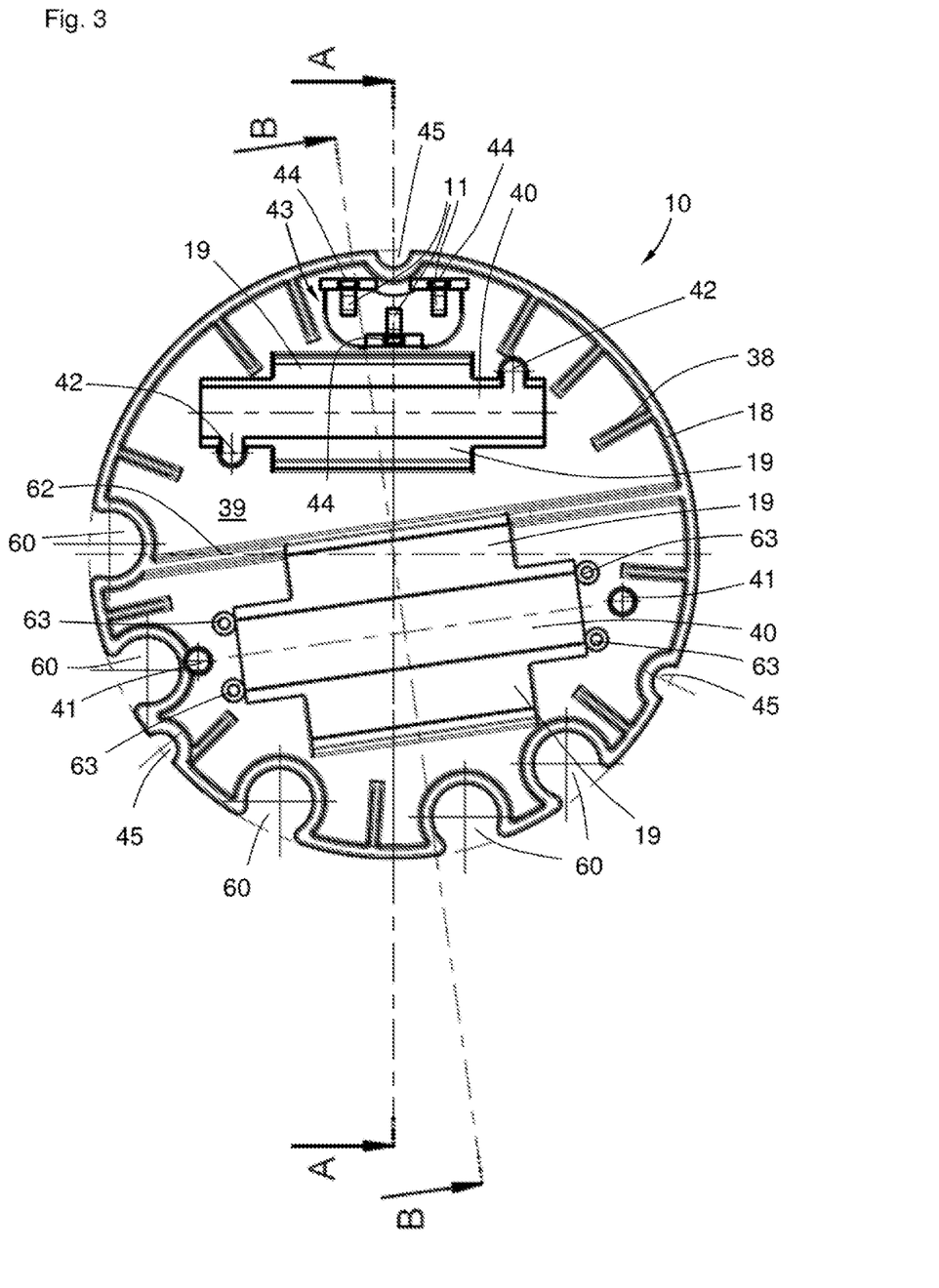

FIG. 3 shows the support plate 10 with its component side. At the edge, the support plate 10 is provided with a collar 18 that is joined by stiffening ramps 38, which are directed radially inward and stiffen a base plate 39. From the base plate 39, receiving geometries 19 protrude, which geometries are largely adapted to the components that are to be assembled. Inside the receiving geometries 19, recesses 40 are provided, which enable a slight sinking of the components to be assembled, thus saving installation space.

Furthermore, several feedthroughs 41 and add-ons 42 to the recess 40 in the base plate 39 are provided, through which connection wires of the components to be assembled can be led. The add-ons 42 serve the purpose of leading the connection wires of an inductor 7 through them, which is why they are arranged on opposite sides of the recess 40. The limit stop 11 is arranged on a protruding plateau 43 and is designed to receive mounting forces of the contact element 12 (see FIGS. 1 and 2). Here, the three contact elements are provided, which are mounted in different misalignment directions (misalignment between plug contact position and circuit board contact position). On the outer edge of the support plate 10, three indentations 45 are formed that engage with respective counter-contours of the motor housing 8 (longitudinal ribs), thus ensuring security against rotation of the support plate 10.

Figure 4:
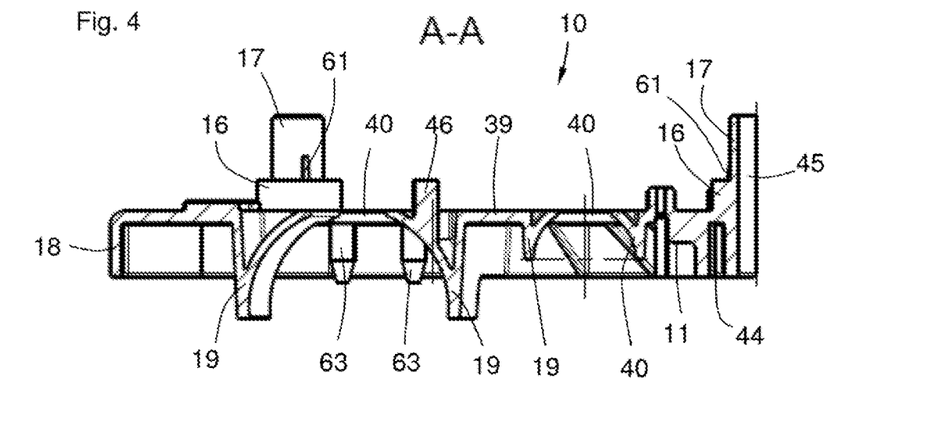

FIG. 4 shows a first section A-A through the support plate 10, along with the base plate 39, the receiving elements 19, the feedthroughs 40, the collar 18, the protrusions 16, the receiving elements 17, the limit stop 11, a contact channel 44, in which a contact element 12 can be mounted. The protrusions 16 serve as butting surface for the circuit board 5. The receiving element 17 limits the receiving space for the circuit board 5 in radial direction. A supporting pin 46 arranged approximately in the center of the support plate 10 serves as additional butting region on the circuit board 5. This supporting pin 46 prevents the circuit board from bending during assembly from the pressure of a heat conduction agent. The recess 45 is provided in the region of the projection 16 and the receiving element 17. The circuit board 5 is also provided with recesses in which the receiving elements 17 engage. This also serves to ensure that the circuit board 5 is secured against rotation. Tool recesses 60 along the edge of the support plate 10 allow for an assembly tool to be put through for supporting the circuit board 5. Furthermore, scraper ribs 61 are shown, which scraper ribs serve the purpose of receiving the circuit board. These scraper ribs 61 are dimensioned in such a way that they give in, or can be scraped back, if the circuit board 5 is oversized, so that a connection without play is achieved.

Figure 5:
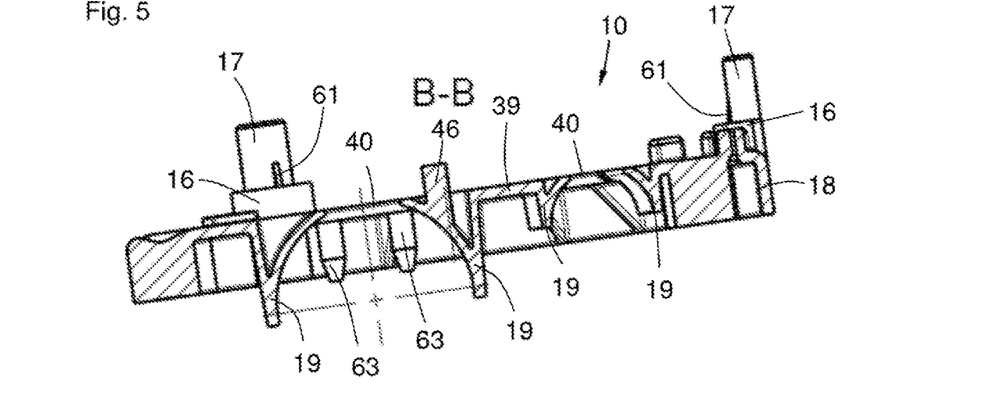

FIG. 5 shows a section B-B through the support plate 10, along with the base plate 39, the receiving elements 19, the recesses 40, the collar 18, the protrusions 16, the receiving elements 17, the scrape ribs 61 and the supporting pin 46.

Figure 6:
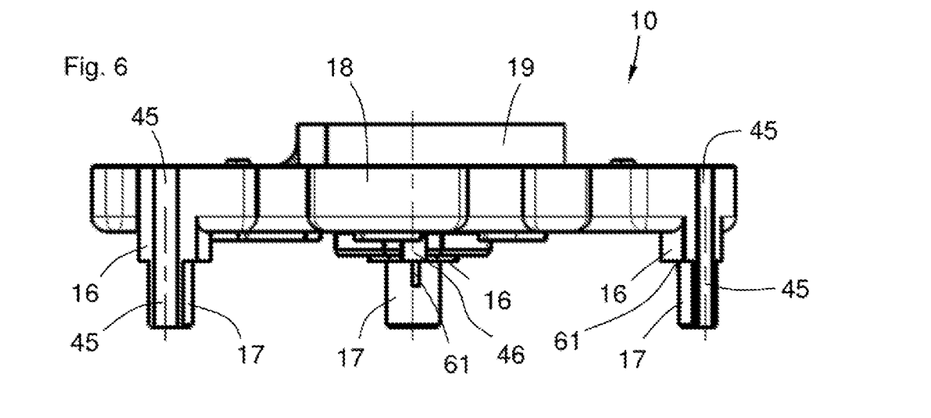

FIG. 6 shows a top view of the support plate 10 with a receiving element 19, the collar 18, the protrusions 16, the receiving elements 17, one scraper rib 61, the recesses 45 and the supporting pin 46.

Figure 7:
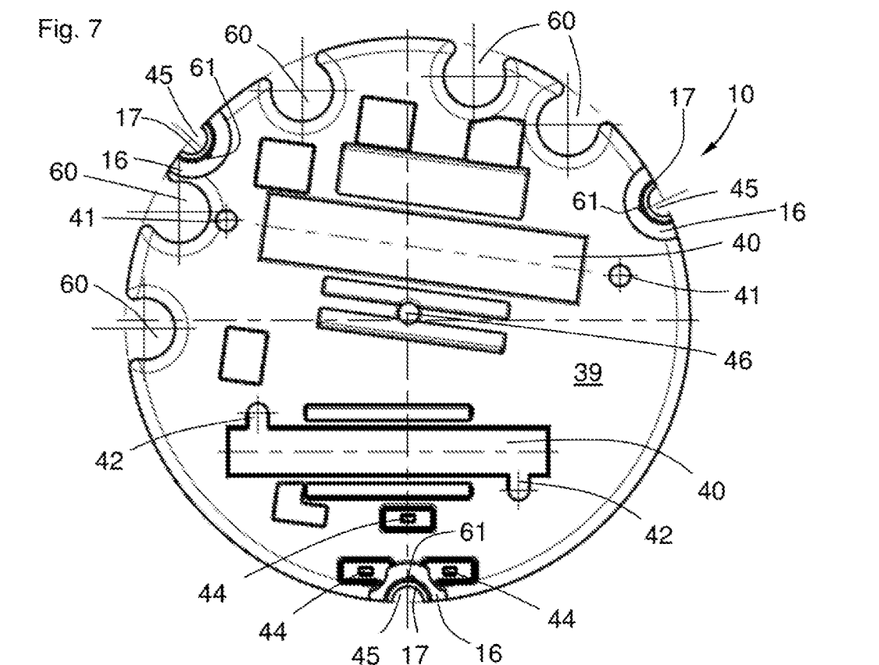

FIG. 7 shows a back view of the support plate 10, with the base plate 39, the recesses 40, the feedthroughs 41, the add-ons 42, the protrusions 16, the receiving elements 17, the scraper ribs 61, the recesses 45, the tool recesses 60, the contact channels 44 for receiving the contact elements 12 and the supporting pin 46.

Figure 8:
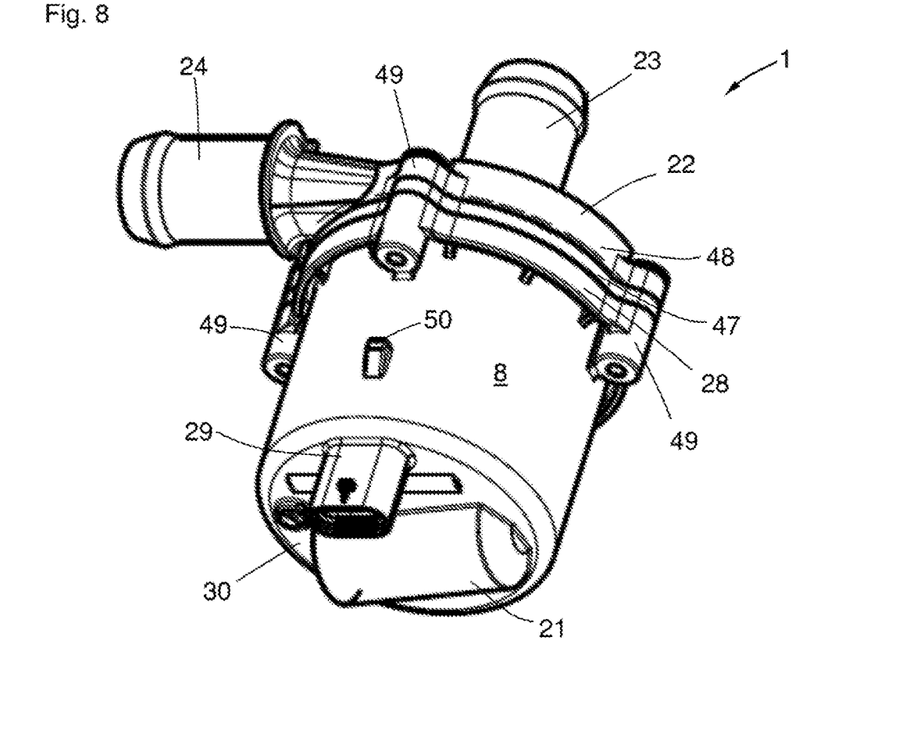

FIG. 8 shows a three-dimensional representation of the centrifugal pump motor 1, with the pump head 22, with suction port 23 and pressure port 24 and a pump head flange 48, a containment shell flange 47 that is integrally formed with the containment shell 3, the motor housing 8, with the housing flange 28, the bottom 30, the connector chamber 29 and the bulge 21 for receiving an electrolytic capacitor 6. Further, screw holes 49 can be seen, which are formed as add-ons in the pump head flange 48, the containment shell flange 47 and the housing flange 28, and enable screw connections. On the motor housing 8, an axial securing shape 50 is formed, which serves the purpose of axially securing a ring-shaped attachment system arranged around the motor housing 8.

Figure 9:
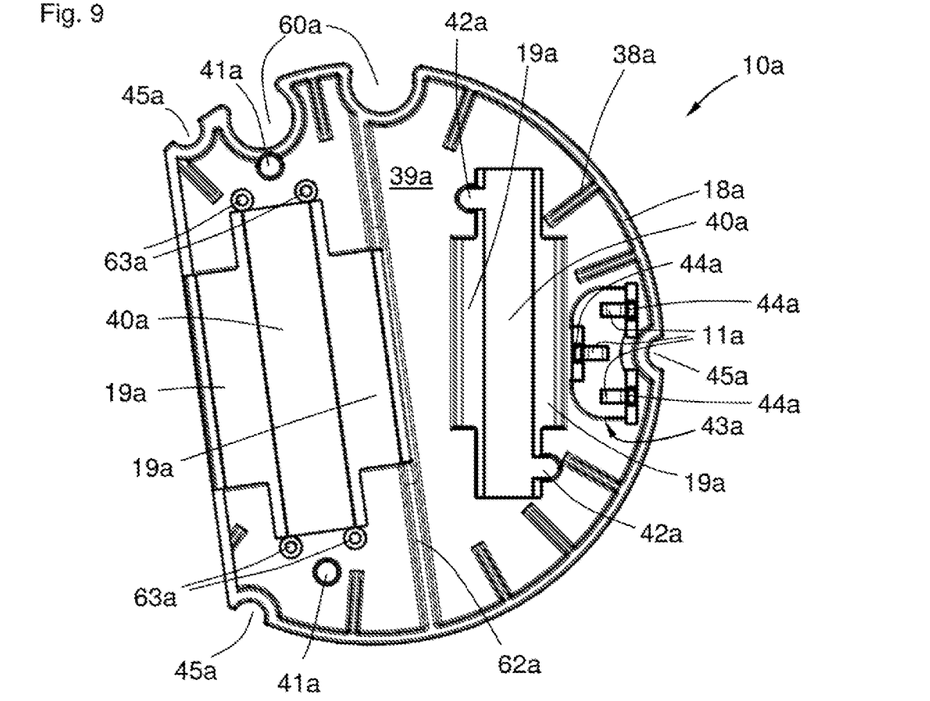

FIG. 9 shows a front view of an alternative support plate 10a with its component side. At the edge, the support plate 10a is provided with a collar 18a that is joined by stiffening ramps 38a, which are directed radially inward and stiffen a base plate 39a. From the base plate 39a, receiving geometries 19a protrude, which geometries are largely adapted to the components that are to be assembled. Inside the receiving geometries 19a, recesses 40a are provided, which enable a slight sinking of the components to be assembled, thus saving installation space. Furthermore, several feedthroughs 41a and add-ons 42a to one of the recesses 40a in the base plate 39a are provided, through which connection wires of the components to be assembled can be led. The add-ons 42a serve the purpose of leading the connection wires of an inductor through them, which is why they are arranged on opposite sides of the recess 40a.

The limit stop 11a is arranged on a protruding plateau 43a and is designed to receive mounting forces. Here, three contact elements 12 can be received, which can be mounted in different misalignment directions (misalignment between plug contact position and circuit board contact position). On the outer edge of the support plate 10a, three indentations 45a are formed that engage with respective counter-contours of the motor housing (longitudinal ribs), thus ensuring security against rotation of the support plate 10a. A stiffening wall 62a enhances the bending strength of the support plate 10a. The difference with respect to the first embodiment lies in the fact that the support plate 10a has a base form that resembles a D. Thus, areas of the support plate 10a that are not used are left out. This makes the required injection molding tool simpler and reduces shrinkage problems associated with the injection molding process.

Figure 10:
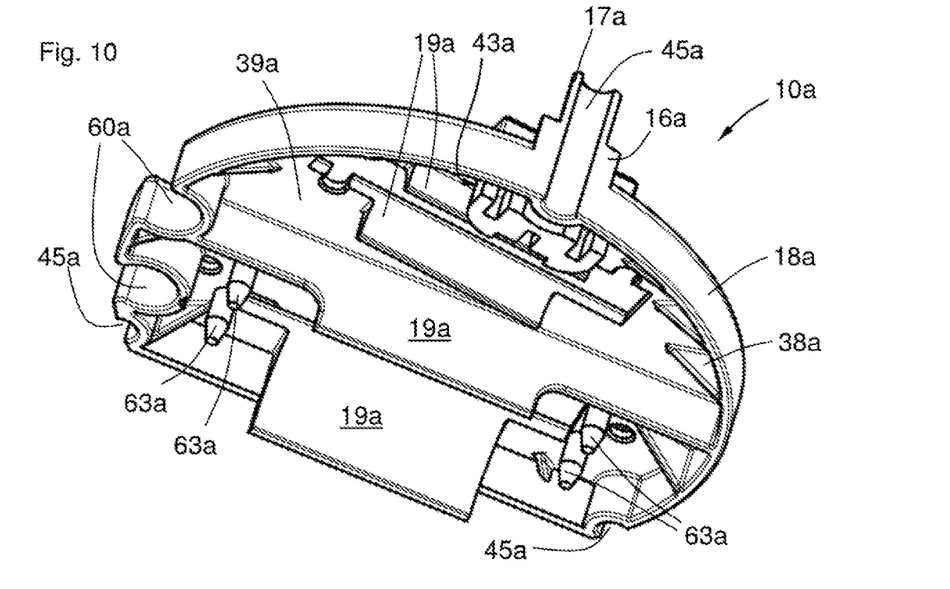

FIG. 10 shows a three-dimensional representation of the alternative support plate 10a, with the collar 18a, the base plate 39a, stiffening ramps 38a between the collar 18a and the base plate 39a, the receiving geometries 19a for an electrolytic capacitor on the one hand and an inductor on the other hand, joining aids 63a with cone-shaped chamfers for easier insertion of the electrolytic capacitor, the tool recesses 60a, protrusions 16a, receiving elements 17a, the plateau 43a and the recesses 45a.

Figure 11:
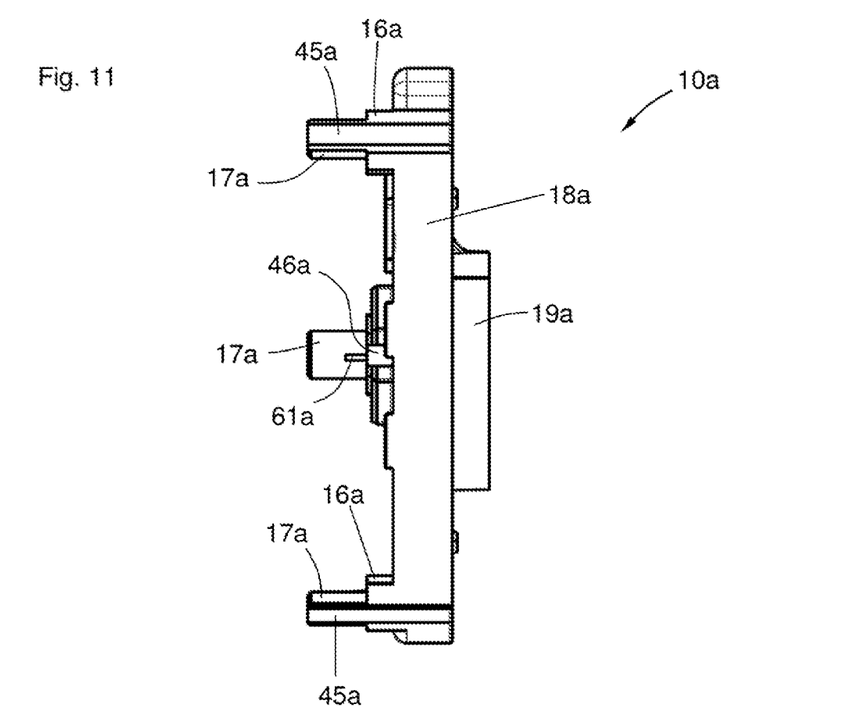

FIG. 11 shows a side view of the alternative support plate 10a, with the collar 18a, the protrusions 16a, the receiving elements 17a, scraper ribs 61 on the receiving elements 17a, which have a tapering, the recesses 45a and the supporting pin 46a.

Figure 12:
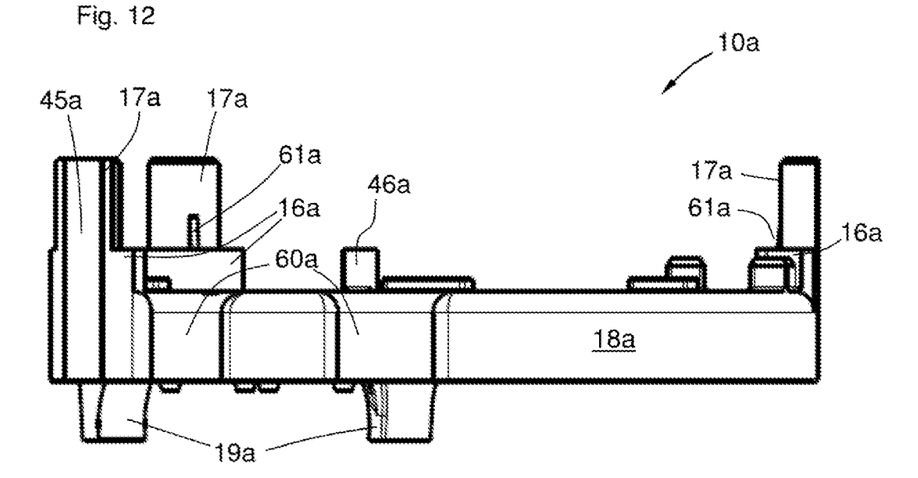

FIG. 12 shows a top view onto the alternative support plate 10a, with the collar 18a, the receiving geometries 19a, the protrusions 16a, the receiving elements 17a, the scraper ribs 61a, the recesses 45a, the tool recesses 60a and the supporting pin 46a.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

| | |
|---|---|
| 1 | Centrifugal pump motor |
| 2 | Permanent magnet rotor |
| 3 | Containment shell |
| 4 | Stator |
| 5 | Circuit board |
| 6 | Electrolytic capacitor |
| 7 | Inductor |
| 8 | Motor housing |
| 9 | Plug connection |
| 10 | Support plate |
| 11 | Limit stop |
| 12 | Contact element |
| 13 | Angled portion |
| 14 | Section |
| 15 | Insulating element |
| 16 | Protrusion |
| 17 | Receiving element |
| 18 | Collar |
| 19 | Receiving geometry |
| 20 | Stop disc |
| 21 | Bulge |
| 22 | Pump head |
| 23 | Suction port |
| 24 | Pressure port |
| 25 | Dry space |
| 26 | Wet space |
| 27 | Axis |
| 28 | Housing flange |
| 29 | Connector chamber |
| 30 | Bottom |
| 31. | Heat conduction agent |
| 32 | Laminated core |
| 33 | Winding |
| 34 | Protruding region |
| 35 | Housing protrusion |
| 36 | Radial boundary |
| 37 | Welding region |
| 38 | Stiffening ramp |
| 39 | Base plate |
| 40 | Recess |
| 41 | Feedthrough |
| 42 | Add-on |
| 43 | Plateau |
| 44 | Contact channel |
| 45 | Recess |
| 46 | Supporting pin |
| 47 | Containment shell flange |
| 48 | Pump head flange |
| 49 | Screw hole |
| 50 | Axial supporting shape |
| 51 | Screw |
| 52 | Pump impeller |
| 53 | Hollow shaft |
| 54 | O-Ring |
| 55 | Cover disc |
| 56 | Fixed bearing |
| 57 | Spherical bearing |
| 58 | Ring magnet |
| 59 | Fastening sleeve |
| 60 | Tool recess |
| 61 | Scraper rib |
| 62 | Stiffening wall |
| 63 | Joining aid |
| 64 | Cooling pins |
| 65 | Recess |

What is claimed is:

1. A centrifugal pump motor receiving a large electrical component, the pump motor comprising:
an axis;
a permanent magnet rotor rotatable about the axis;
a wound stator;
a containment shell for separating the wound stator from the permanent magnet rotor;

a circuit board, to which the large electrical component is electrically connected; and a motor housing with a plug connection, wherein the electronic component is mechanically held by a support plate within the motor housing at a distance from the circuit board, wherein the permanent magnet rotor is disposed radially inside of the wound stator, wherein the stator is provided with an insulating element, which directly abuts against the circuit board in the direction parallel to the axis, and wherein the insulating element is welded to the motor housing.

2. The centrifugal pump motor according to claim 1, further comprising at least one contact element electrically connected to the circuit board, wherein the support plate is provided with a limit stop for the at least one contact element.

3. The centrifugal pump motor according to claim 2, wherein at least one contact element has at least two angled portions, and one section between the angled portions, which one section abuts against the limit stop.

4. The centrifugal pump motor according to claim 1, wherein the electronic component is an electrolytic capacitor or an inductor, or that multiple components are provided for, which components comprise at least one electrolytic capacitor and at least one inductor.

5. The centrifugal pump motor according to claim 1, wherein the support plate is held without play between the circuit board and the motor housing.

6. The centrifugal pump motor according to claim 1, wherein the support plate and the circuit board are held without play between the stator and the motor housing.

7. The centrifugal pump motor according to claim 1, wherein the support plate further comprises receiving elements and/or scraper blades for centering the circuit board.

8. The centrifugal pump motor according to claim 1, wherein the insulating element abuts against the circuit board in at least three places.

9. The centrifugal pump motor according to claim 1, wherein the support plate further comprises multiple protrusions which abut against the insulating element.

10. The centrifugal pump motor according to claim 1 wherein the support plate further comprises multiple receiving elements, which provide a radial limitation for an installation space of the circuit board.

11. The centrifugal pump motor according to claim 10, wherein the installation space for the insulating element is radially limited by the receiving elements.

12. The centrifugal pump motor according to claim 1, wherein the support plate is provided with an at least partly circumferential collar.

13. The centrifugal pump motor according to claim 1, wherein the support plate further comprises receiving geometries for the electronic component or for multiple electronic components.

14. The centrifugal pump motor according to claim 13, wherein the support plate is provided with a recess as part of the receiving geometry.

15. The centrifugal pump motor according to claim 1, wherein the motor housing has at least one bulge that is adapted to the shape of the electronic component.

16. The centrifugal pump motor according to claim 15, a heat conducting agent between the electronic component and the bulge.

17. A method for assembling a centrifugal pump motor consisting of one permanent magnet rotor, one wound stator including an insulating element, which stator is separated from the permanent magnet rotor by means of a containment shell, one circuit board having one large electronic component electrically connected to it, which electronic component has a diameter that is several times bigger than the thickness of the circuit board, a support plate for supporting the electronic component, and a motor housing with a plug connection, the method comprising the steps of:

a) providing a motor housing;

b) providing a pre-assembled unit comprising the stator, the circuit board and the support plate;

c) inserting the pre-assembled unit into the motor housing;

d) holding down the assembly and welding an insulating element of the stator onto the motor housing, thereby exerting a force;

e) assembling the containment shell and the permanent magnet rotor; and f) assembling the pump head, wherein the permanent magnet rotor is disposed radially inside of the wound stator.

18. The method according to claim 17, wherein the welding of the insulating element to the motor housing is performed using laser transmission welding technology employing a laser beam, wherein the width of the welding region is adapted to the diameter of the laser beam.

19. The centrifugal pump motor according to claim 1, wherein the containment shell separates a wet space of the pump motor from a dry space of the pump motor, such that fluid does not pass from the wet space to the dry space.

20. The method according to claim 17, wherein the containment shell separates a wet space of the pump motor from a dry space of the pump motor, such that fluid does not pass from the wet space to the dry space.

21. The centrifugal pump motor according to claim 19, wherein the containment shell comprises a bottomed cylinder shape, such that a first end is open and a second end is closed.

22. The centrifugal pump motor according to claim 19, wherein the containment shell comprises a material that can be processed via injection molding.

23. The method according to claim 20, wherein the containment shell comprises a bottomed cylinder shape, such that a first end is open and a second end is closed.

24. The method according to claim 20, wherein the containment shell comprises a material that can be processed via injection molding.

* * * * *